United States Patent
Andersson (10) Patent No.: US 12,358,725 B2
(45) Date of Patent: Jul. 15, 2025

(54) VACUUM LIFTING DEVICE (71) Applicant: PRITEC VACULYFT AB, Fjärås (SE)

(72) Inventor: Roland Andersson, Fjärås (SE)

(73) Assignee: PRITEC VACULYFT AB, Fjärås (SE)

( * ) Notice: Subject to any disclaimer, the term of this patent is extended or adjusted under 35 U.S.C. 154(b) by 730 days.

(21) Appl. No.: 17/638,981

(22) PCT Filed: Aug. 28, 2020

(86) PCT No.: PCT/EP2020/074122
§ 371 (c)(1),
(2) Date: Feb. 28, 2022

(87) PCT Pub. No.: WO2021/038069
PCT Pub. Date: Mar. 4, 2021

(65) Prior Publication Data
US 2022/0297943 A1 Sep. 22, 2022

(30) Foreign Application Priority Data
Aug. 29, 2019 (SE) .................. 1950984-3

(51) Int. Cl.
*B25J 15/06* (2006.01)
*B65G 7/12* (2006.01)
(Continued)

(52) U.S. Cl.
CPC ............ *B65G 7/12* (2013.01); *B25J 15/0625* (2013.01); *B25J 15/0683* (2013.01);
(Continued)

(58) Field of Classification Search
CPC ... E01C 19/524; B66C 1/0225; B66C 1/0281; B66F 7/065; B25J 15/065; B25J 15/0658; B25J 15/0666; B25J 15/0683; B65G 7/12
(Continued)

(56) References Cited

U.S. PATENT DOCUMENTS 3,743,340 A * 7/1973 Williamann .......... B66C 1/0212
294/186
4,925,225 A * 5/1990 Dost ..................... B66C 1/0293
294/186
(Continued)

FOREIGN PATENT DOCUMENTS

CN 108423531 A 8/2018
DE 4327663 A1 2/1995
(Continued)

OTHER PUBLICATIONS

International Preliminary Report on Patentability for PCT Patent App. No. PCT/EP2020/074122 (Jul. 15, 2021).
(Continued)

*Primary Examiner* — Paul T Chin
(74) *Attorney, Agent, or Firm* — Cermak & McGowan LLP; Malcolm K. McGowan (57) ABSTRACT A vacuum lifting device to facilitate the lifting and/or repositioning of an article having an external surface as set out herein comprises at least one pair of handles and a base having opposed first and second surfaces, the base having an aperture arranged through the base. The second surface is arranged is provided with a continuous sealing joint projecting downwards from the second surface defining an
(Continued)

enclosed area which includes the aperture on the bottom surface of the base. The vacuum lifting device also comprises a suction conduit arranged to be connected to a vacuum generating member and configured to be in fluid connection with the second surface of the base through the aperture. The vacuum lifting device further comprises an extendable lifting member arranged between the at least one pair of handles and the first surface of the base, the lifting member is actuated by a lift actuating member for shifting the base in a vertical direction transferring said vacuum lifting device (10) between an extended and a compressed state. A method for using the vacuum lifting device is also disclosed.

17 Claims, 4 Drawing Sheets

(51) Int. Cl.
*B66C 1/02* (2006.01)
*B66F 7/06* (2006.01)
*E01C 19/52* (2006.01)
(52) U.S. Cl.
CPC ............ *B66C 1/0225* (2013.01); *B66F 7/065* (2013.01); *B65G 2201/022* (2013.01); *B65G 2201/0223* (2013.01); *E01C 19/524* (2013.01)
(58) Field of Classification Search
USPC .......................................... 414/627; 294/183
See application file for complete search history.

(56) References Cited

U.S. PATENT DOCUMENTS

| | | | |
|---|---|---|---|
| 5,707,094 A * | 1/1998 | Gower | B66D 3/18 |
| | | | 294/188 |
| 6,095,581 A | 8/2000 | Brewer | |
| 9,919,432 B1 | 3/2018 | Morin et al. | |
| 11,485,575 B2 * | 11/2022 | Dooley | B66F 7/0625 |
| 2010/0219651 A1 | 9/2010 | Walter et al. | |

FOREIGN PATENT DOCUMENTS

| | | | | |
|---|---|---|---|---|
| DE | 19601222 A1 | 7/1997 | | |
| DE | 10145977 A1 | 4/2003 | | |
| DE | 202009000678 U1 * | 4/2009 | ........... | E01C 19/524 |
| DE | 102009008203 B3 | 4/2010 | | |
| DE | 202011100044 U1 | 6/2012 | | |
| EP | 0879784 A2 | 11/1998 | | |
| FR | 2973360 A1 | 10/2012 | | |
| GB | 2120610 A | 12/1983 | | |
| GB | 2259079 A | 3/1993 | | |
| NL | 8901001 | 11/1990 | | |
| NL | 1034135 C2 | 1/2009 | | |
| WO | WO2005/105541 A1 | 11/2005 | | |

OTHER PUBLICATIONS

International Search Report for PCT Patent App. No. PCT/EP2020/074122 (Nov. 11, 2020).

* cited by examiner

VACUUM LIFTING DEVICE

CROSS-REFERENCE TO RELATED APPLICATIONS

This application is a continuation of PCT/EP2020/074122, filed 28 Aug. 2020, which claims priority from Swedish patent application SE 1950984-3, filed 29 Aug. 2019. The contents of these priority applications are incorporated herein by reference in their entirety.

TECHNICAL FIELD

The present disclosure relates to vacuum lifting devices, and more particularly to manual vacuum lifting devices for lifting, moving and positioning heavy planar objects. A method for manual displacement of such heavy planar objects using the manual vacuum lifting device is also described.

BACKGROUND OF THE INVENTION

In the construction trade the use of slabs of construction material such as concrete slabs, paving stones or the like are common. These slabs are generally quite large (90 cm×60 cm×5 cm) and heavy (sometimes about as much as 90 kg) thus making manual lifting, moving and positioning these slabs very difficult. This is particularly the case where slabs are placed on a flat surface e.g. the ground or the back of a lorry where it is very difficult to get a good grip of the slab.

It can for example be very difficult when a patio or path or the like is being constructed, to move and/or lay the slabs into position, since spaces where the slabs are to be placed are generally closely bounded by other slabs which have already been moved into position. Thus, placing the slabs into position often involves the risk that the person doing this may trap or injure their fingers.

Furthermore, once in place, it can be very difficult to manually maneuver the slabs without using some lever means. This can be time consuming and may also damage the slab or surrounding slabs.

Vacuum lifting systems, so-called "pick-and-place" systems or vacuum lifting devices operate using a hard vacuum which is formed between the device and a slab and can be used to transfer slabs from a first location to a second location. Vacuum lifting devices are often automated, electrically powered and integrated with, or attached to mobile cranes, telescopic lifting systems, trolleys or forklifts.

However, in some situations manually operated vacuum lifters are convenient. For example at smaller work sites or in private gardens where large equipment can't gain access. Manually operated vacuum lifters are often handled by two users who cooperate to maneuver the vacuum lifting device and the object to be lifted. Conventional manually operated vacuum lifters comprise a vacuum source and a housing arranged on a base plate. The bottom surface of the base plate is provided with a sealing joint, which, when in use will contact the article being lifted. One or two pairs of handles facing in opposite directions are arranged somewhere on the housing or on the base plate for the users to grip when maneuvering the vacuum lifting device. Very often the handles are angled upwards at an angle of about 30 to 50° in relation to the base plate which is parallel to the ground. This configuration of the handles saves the users from having to bend their backs when placing the slab in the correct position on the ground. It is also ideal when carrying an object attached to the vacuum lift from one location to another as long as the users are able to keep their backs straight.

However, concrete slabs are often delivered on pallets forming stacks that are about 75-120 cm high. Handles arranged at an angle above the plane of the base plate may pose a problem for the persons handling the vacuum lifting device since in order to be able to pick up a slab placed on the top of a pallet the users have to lift their elbows very high, sometimes as high as above their shoulders to be able to place the vacuum lifting device on top of the pallet. It may then be even more difficult to lift the vacuum lifting device with the extra weight of the slab from the pallet.

In these situations the user may also have to shift handgrips on the handle several times to manage the complete lifting procedure when moving a slab between a first location and a second location at different heights from the ground. When lifting the vacuum lifting device from the ground a simple overhand grip is most likely used. However, if the user is required to raise the elbows higher than the shoulders to be able to position the vacuum lifting device at a certain location, e.g. on top of a stack of slabs, the grip may have to be switched to an underhand grip. The reverse shifting of the hands will take place when the vacuum lifting device is taken down, i.e. the underhand grip used when the user can't reach higher will have to change into an overhand grip as the vacuum lifting device is lowered towards the ground.

Such lifting postures may easily cause injuries to the back, wrists and shoulders of the persons maneuvering such devices. A solution to this can be to mount the vacuum lifter on telescopic arms extending in a vertical direction. Telescopic arms are both expensive and require maintenance, such as adding lubricants and exchanging seals to make sure debris such as dust and gravel are not stuck in between the telescoping arms, rendering the vacuum lifting device to malfunction. This is important at construction sites, which are inherently dusty, and particularly while paving pathways as the slabs are often both placed upon sand and then covered with sand to fit the gaps between the slabs.

There is thus a need to improve the design of manually operated vacuum lifting devices to make them more cost efficient and more robust, while being ergonomic for the users having to maneuver such devices.

SUMMARY OF THE INVENTION

An object of the present disclosure is to offer a means for improving the design of manually operated vacuum lifting devices to facilitate the lifting and/or repositioning of an article for users maneuvering such devices.

The above object may be achieved with a vacuum lifting device in accordance with claim 1, and a method for lifting and repositioning an article in an ergonomic and back-saving manner according to claim 17. Further embodiments are set out in the dependent claims, in the following description and in the drawings.

A vacuum lifting device to facilitate the lifting and/or repositioning of an article having an external surface as set out herein comprises at least one pair of handles and a base having opposed first and second surfaces, the base having an aperture arranged through the base. The second surface is arranged in a base plane of the base and is provided with a continuous sealing joint projecting downwards from the second surface. The continuous sealing joint defines an enclosed area which includes the aperture on the bottom surface of the base.

The vacuum lifting device further comprises a suction conduit. The suction conduit is configured to be connected to a vacuum generating member and be in fluid connection with the second surface of the base by means of the aperture which extends through the base. The second surface of the base which is provided with a sealing joint is configured to be positioned onto at least a portion of the external surface of the article to be lifted and/or repositioned.

The vacuum lifting device further comprises an extendable lifting member arranged between the at least one pair of handles and the first surface of the base. The extendable lifting member is arranged to be actuated by a lift actuating member to contract or extend, thereby shifting the base in a first vertical direction towards the at least one pair of handles or in a second direction, opposite to the first direction and away from the at least one pair of handles, thereby transferring the vacuum lifting device between an extended and a compressed state. The extendable lifting member enables the vacuum lifting device to shift between an extended state wherein the distance between the first surface of the base and the handles is long and a contracted state wherein the distance between the first surface of the base and the at least one pair of handles is short.

The vacuum lifting device is especially configured to facilitate the lifting and/or repositioning of articles such as concrete or brick pavers, concrete slabs (e.g. pavement slabs), steel plates (e.g. trench covers), and the like. However it may also be used for lifting other articles such as glass plates, boxes, or parts used e.g. in industrial environments.

The base has opposed first and second surfaces and is advantageously configured as a plate extending in a base plane. The base may have any outline which is suitable for the intended task such as e.g. rectangular, round, or polygonal. The base is provided with an aperture that extends through the base.

The second surface which generally defines a bottom side of the base when the device is in use is arranged in a base plane of the base and is provided with a continuous sealing joint projecting downwards from the second surface of the base. The sealing joint is made from a soft-seal material, and can be of any material with similar physical and mechanical properties to foam rubber. Other examples are natural rubber (natural polyisoprene), butadiene rubber, butyl rubber, chlorinated polyethylene, chlorosulfonated polyethylene, epichlorohydrin rubber, ethylene acrylic, ethylene propylene rubber, fluorocarbon rubber (such as Viton®), fluorosilicone, synthetic isoprene rubber, neoprene rubber, nitrile rubber (NBR), phosphonitrilic fluoroelastomer, polyacrylate rubber, silicone rubber, polysulfide rubber, polyurethane rubber, flexible PVC, and equivalent flexible materials.

Advantageously the extendable lifting member is a scissor lift wherein the folding supports are extended or contracted by means of the lift actuating member for shifting said base in a vertical direction in relation to the at least one pair of handles. Advantageously said lift actuating member for shifting said base in a vertical direction is a gas spring.

As opposed to using regular telescopic arms as extendable lifting members which is commonly found in known vacuum lifting devices, the use of a scissors lift offers several advantages. Vacuum lifting devices are often used at construction sites and dust and gravel may easily enter the telescopic tubes, causing the tubes to malfunction. Instead, by using a scissors lift as the extendable lifting member, whether it is actuated mechanically or by means of hydraulic or pneumatic actuators, the vacuum lifting device becomes more robust. Also, device scissors lift is easy and cheap to maintain and service, as the actuator to handle the scissors lift is easily dismounted for service or replacement, compared to when extendable lifting member is made up by telescopic arms.

The vacuum lifting device may comprise a vacuum generating member actuated by a vacuum actuator for generating a vacuum. The vacuum generating member may in this case be arranged on the first surface of the base, i.e. the top surface of the base, and may e.g. be a vacuum pump, an air compressor, or another device that creates a vacuum. Alternatively vacuum may be provided by an external vacuum generating device.

The vacuum actuator may be a motor or other power generating source for operating the vacuum generating member and may advantageously be arranged on the first surface of the base. Alternatively, the vacuum actuator may be remote from the vacuum generating member and connected thereto, such as by a power conduit. The vacuum actuator is advantageously controlled by a vacuum control member.

The vacuum generating member is advantageously provided with a suction conduit in fluid communication with the second surface of the base through the aperture. When in use, the base is configured such that the second surface with the sealing joint can be positioned onto at least a portion of the external surface of the article to be lifted and/or repositioned. The second surface (i.e. the bottom surface) of the base together with the sealing joint surrounding the bottom perimeter of the base, and the external surface of the article will together form an enclosed area that defines a vacuum lifting chamber. To enable lifting of the article the pressure within the vacuum lifting chamber is reduced by switching on the vacuum actuator thereby actuating the vacuum generating member. Air is sucked out of the vacuum lifting chamber through the suction conduit to create a negative pressure within the vacuum lifting chamber, thereby attaching the vacuum lifting device to the external surface of the article to be lifted and/or repositioned.

The vacuum lifting device may also comprise a vacuum release mechanism. The vacuum release mechanism will allow air to flow into the vacuum lifting chamber and fill it with air. This will eliminate the vacuum within the vacuum lifting chamber and thereby release the article. The vacuum release mechanism may be a mechanical device, such as a valve or an electrical switch.

The vacuum generating member may also comprise a vacuum reservoir in fluid communication with the vacuum generating member and the vacuum lifting chamber. The vacuum reservoir enables the vacuum generating member to generate a constant supply of vacuum for the vacuum lifting chamber.

A housing to enclose the vacuum generating member and the vacuum actuator may be arranged on the first surface of the base to enclose and protect the vacuum generating member as well as the vacuum actuator from the environment.

The vacuum lifting device as disclosed herein is especially arranged for lifting articles such as concrete or brick pavers, concrete slabs, pavement slabs, steel plates, trench covers, glass plates, or packages. The article may also be used for lifting articles for use in industrial environments.

The sealing joint may be made from natural rubber, butadiene rubber, butyl rubber, chlorinated polyethylene, chlorosulfonated polyethylene, epichlorohydrin rubber, ethylene acrylic, ethylene propylene rubber, fluorocarbon rubber, fluorosilicone, synthetic isoprene rubber, neoprene rubber, nitrile rubber (NBR), phosphonitrilic fluoroelastomer, polyacrylate rubber, silicone rubber, polysulfide rubber, polyurethane rubber, flexible PVC.

In an advantageous embodiment the sealing joint is made from foam rubber.

Preferably the vacuum lifting device comprises two pairs of handles arranged opposite to each other thereby enabling two persons to cooperate when using the vacuum lifting device. Advantageously the handles extend parallel to the base plane of the base, but the handles may deviate from the base plane with at most 30°, at most 25°, at most 20°, at most 15°, at most 10°.

Preferably the height of each of the pair of handles is individually adjustable to accommodate for different heights of the users.

Disclosed herein is also a method to facilitate the lifting and/or repositioning of an article having an external surface. The process for lifting an article to be moved/repositioned starts by actuating the lift extending member to shift the base in a vertical direction to position the base member of the vacuum lifting device on top of an external surface of an article to be lifted and/or repositioned. The lift extending member is actuated by means of the lift actuating member. Once the base has been provided in the proper position the lift vacuum generating member is actuated by means of the vacuum actuator and a vacuum sufficient enough to support the weight of the article when lifted is established between the article and the base of the vacuum lifting device. The vacuum lifting device with the article is moved to the intended location where the article is to be repositioned. The extendable lifting member is actuated to shift said base in the vertical direction to position said article in new a location and the vacuum release mechanism is actuated to release the article from the vacuum lifting device.

DETAILED DESCRIPTION

It is to be understood that the drawings are schematic and that individual components are not necessarily drawn to scale. The manual vacuum lifting device shown in the figures is provided as examples only and should not be considered limiting to the invention as disclosed herein. In particular, it should be understood that the vacuum lifting device as disclosed herein may be applied to any technical field where a manual vacuum lifting device is applicable. Furthermore, the size and shape of the manual vacuum lifting device may be different from what is shown in the figures. The vacuum lifting device may have a different sizes and shapes, and may have a differently shaped handles, bases, vacuum generating members, actuators or reservoirs as set out herein.

Figure 1:
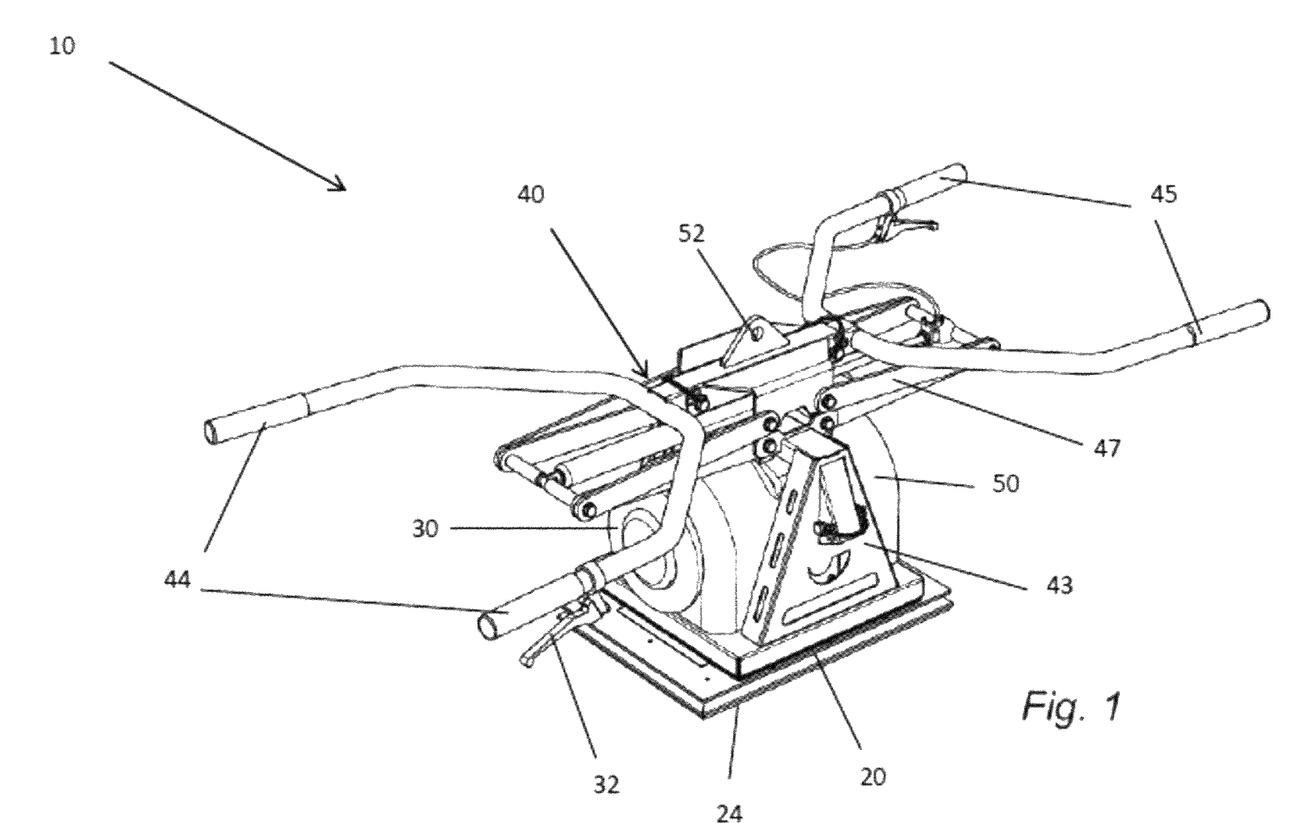
FIG. 1 illustrates the vacuum lifting device in the compressed state
Figure 2:
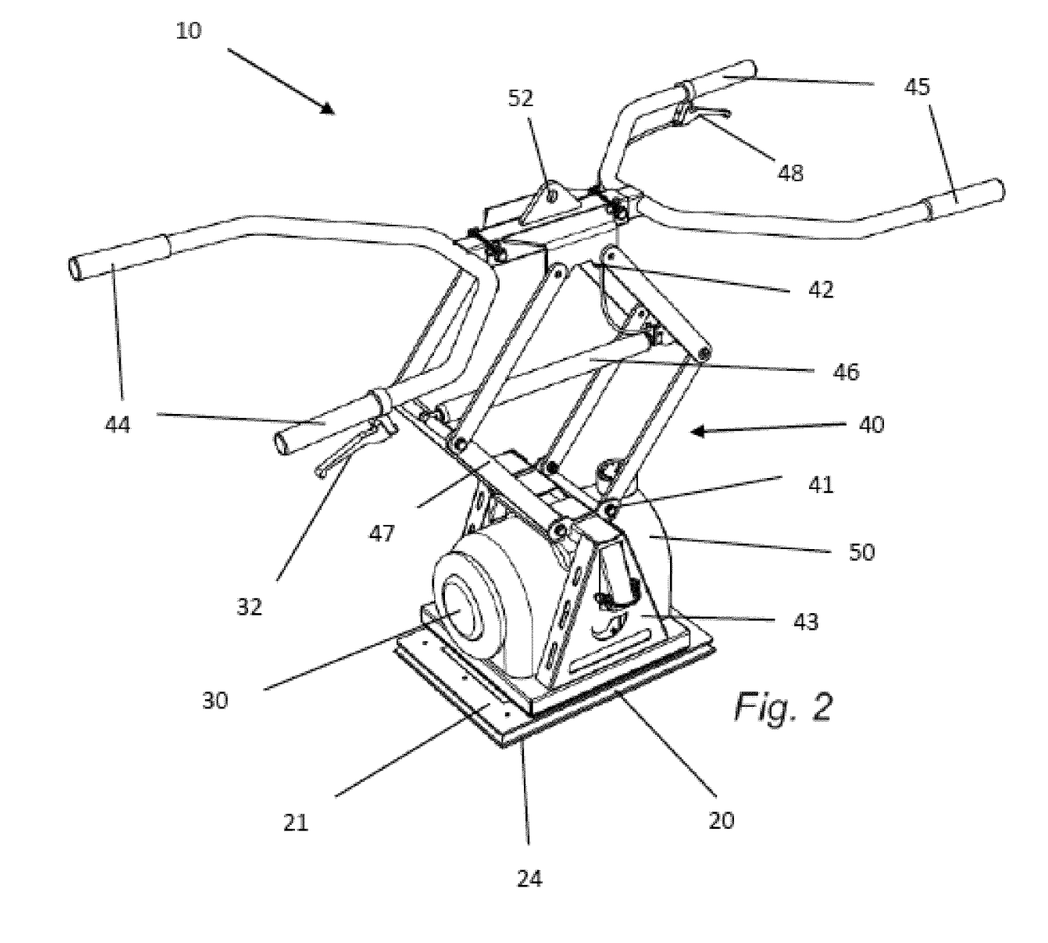
FIG. 2 illustrates the vacuum lifting device in the extended state
Figure 3A:
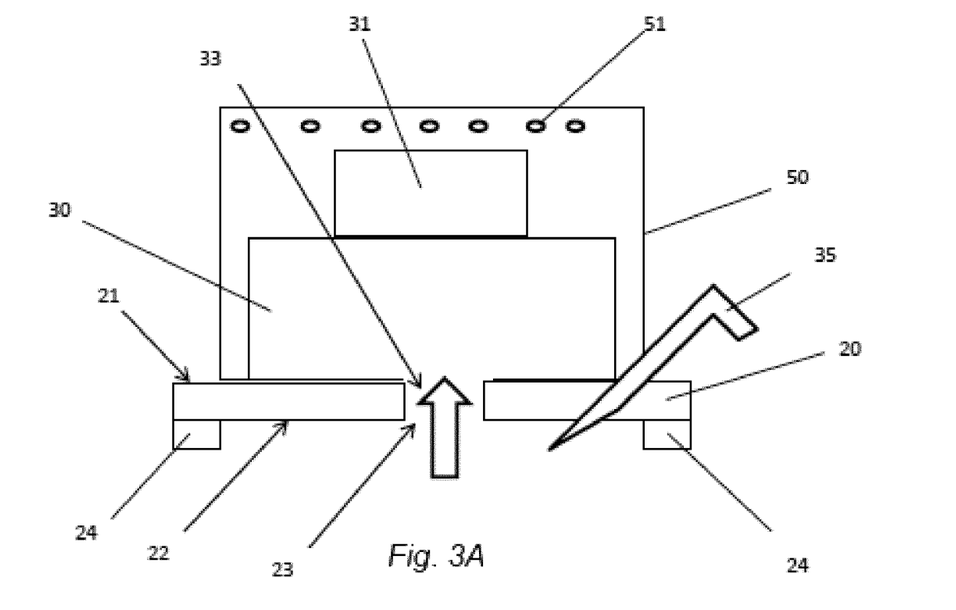
FIGS. 3A and B show cross-sections of the vacuum lifting device
Figure 3B:
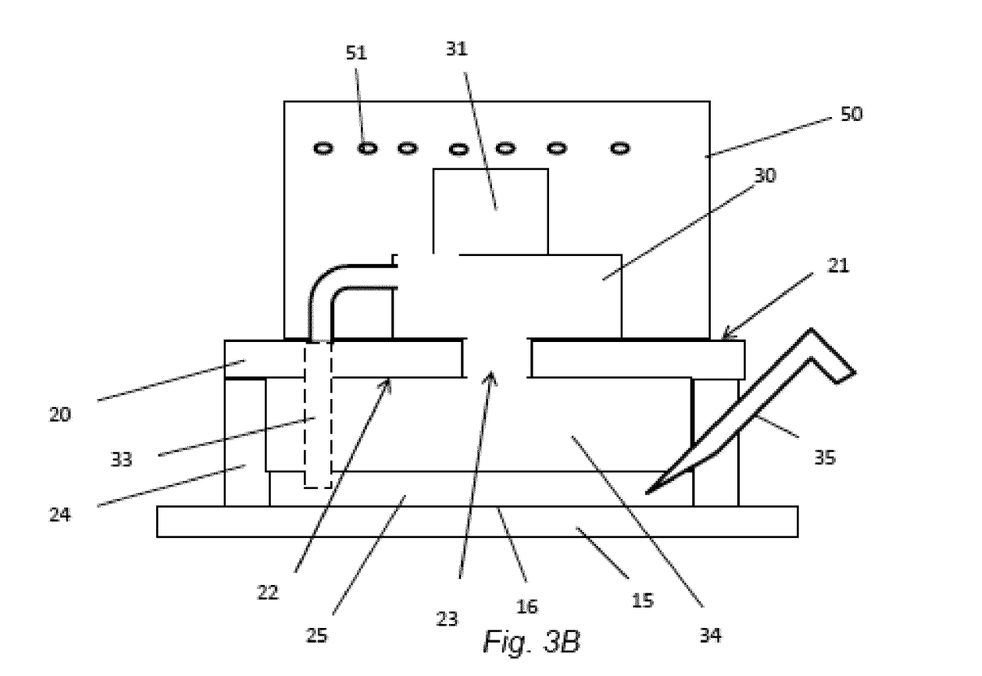

FIGS. 1 to 3 disclose a manual vacuum lifting device 10 that may be used for lifting and/or repositioning of an article 15 having an external surface. The vacuum lifting device 10 as disclosed herein is configured to lift articles 15 such as concrete or brick pavers, concrete slabs (e.g. pavement slabs), steel plates (e.g. trench covers), and the like. However it may also be used for lifting other articles 15 such as glass plates, boxes, or parts used in e.g. industry.

The vacuum lifting device 10 includes a base 20 having opposed first and second surfaces 21, 22 as seen in FIGS. 3a and 3b. The first surface 21 generally defines an upper side and the second surface 22 generally defines a bottom side of the base 20 when the device is in use. The base 20 may be constructed from any suitable material that is advantageously strong and robust such as steel, metal, aluminum or plastics. Preferably the base 20 is in a shape of a plate, as seen in the illustrations enclosed herein. The base 20 is provided with an aperture 23 arranged through the base 20 (see FIGS. 3a and b). While the embodiment of the vacuum lifting device 10 illustrated in figures herein is generally square in configuration, it will be appreciated that the base 20 could be constructed in a rectangular, round or other suitable configuration.

The second surface 22 of the base 20 is arranged in a base plane of the base 20 and is provided with a sealing joint 24 projecting downwards from the second surface 22 of the base 20. The sealing joint 24 extends continuously around the entire perimeter of the second surface 22 of the base 20 defining an enclosed area which includes the aperture 23 extending through the base 20 (see FIG. 3a).

The sealing joint 24 is preferably made of a soft-seal material which surrounds the second surface 22 of the base 20, but can be of any material with similar physical and mechanical properties to foam rubber. Other examples are natural rubber (natural polyisoprene), butadiene rubber, butyl rubber, chlorinated polyethylene, chlorosulfonated polyethylene, epichlorohydrin rubber, ethylene acrylic, ethylene propylene rubber, fluorocarbon rubber (such as Viton®), fluorosilicone, synthetic isoprene rubber, neoprene rubber, nitrile rubber (NBR), phosphonitrilic fluoroelastomer, polyacrylate rubber, silicone rubber, polysulfide rubber, polyurethane rubber, flexible PVC, and equivalent flexible materials.

A vacuum generating member 30 for generating a vacuum may be mounted on the first surface 21 of the base 20 (see FIG. 3a). Optionally, the vacuum generating member 30 may constitute a vacuum pump. Alternatively, the vacuum generating member 30 may constitute an air compressor, or another device that creates a vacuum located remotely from the vacuum lifting device 10. The vacuum generating member 30 may include a vacuum actuator 31 such as a motor or other power generating source for operating the vacuum generating member 30 (see FIG. 3a). The vacuum actuator 31 may also be mounted to the first surface 21 of the base 20. The vacuum actuator 31 may be operated to directly drive the vacuum generating member 30. Alternatively, the vacuum actuator 31 may be operated to supply power to the vacuum generating member 30, which includes a separate driver for operating the vacuum generating member 30. In an alternative embodiment, the vacuum actuator 31 may be remote from the vacuum generating member 30 and connected thereto, such as by a power conduit (not shown). The vacuum actuator 31 is controlled by a vacuum control member 32.

The vacuum generating member 30 is provided with a suction conduit 33. The suction conduit 33 of the vacuum generating member 30 may be a hose, tube, pipe (see FIG. 3b) or alternatively the conduit may simply be an opening sized and shaped so as to cover and or cooperate with the aperture 23 of the base 20 (see FIG. 3a).

In use the vacuum lifting device 10 is placed onto the surface of the article 15 to be lifted and/or repositioned such that the sealing joint 24 arranged at the second surface 22 of the base 20 contacts at least a portion of the external surface of the article 15. The second surface 22 of the base 20, the sealing joint 24 surrounding the base 20 second surface 22, and the external surface of the article 15 will together form an enclosed area that defines a vacuum lifting chamber 25 (see FIG. 3b). The pressure within the vacuum lifting chamber 25 is reduced by switching on the vacuum actuator 31 thereby actuating the vacuum generating member 30. Air is sucked out of the vacuum lifting chamber 25 through the suction conduit 33 (see arrow in FIG. 3a) to create a negative pressure within the vacuum lifting chamber 25. The sealing joint 24 which is made from a soft material facilitates in the formation of a vacuum by conforming to any irregularities on the surface of the article 15 to be lifted or repositioned.

The vacuum lifting device 10 may also in some embodiments include a vacuum reservoir in fluid communication with the vacuum generating member 30 and the vacuum lifting chamber 25 (see FIG. 3b). The vacuum reservoir is arranged between the second surface 22 of the base and the vacuum lifting chamber 25. The flow of air between the vacuum lifting chamber 25 and the vacuum reservoir may be controlled, by e.g. a valve or other device (not shown) that controls airflow through the suction conduit 33. During operation, the control valve may be closed until a vacuum having a predetermined negative pressure is created within the vacuum reservoir. Once the vacuum lifting device 10 is positioned on the article 15, the control valve may be opened and the air within the vacuum lifting chamber 25 may be quickly expelled from the vacuum lifting chamber 25 into the vacuum reservoir to create a vacuum within the vacuum lifting chamber 25. This surge of vacuum into the vacuum lifting chamber 25 creates a fast seal between the base 20 and the article 15.

Advantageously the vacuum reservoir has a larger volume than the vacuum lifting chamber 25 such that the volume of the vacuum reservoir is sufficient enough to maintain a constant supply of vacuum for the vacuum lifting chamber 25. In this way the vacuum lifting device 10 may repeatedly be ready for use, and there is no need to wait for a vacuum to build up in the vacuum lifting chamber 25 as the vacuum surge from the vacuum reservoir is very quick when the control valve is operated.

The vacuum lifting device 10 includes a vacuum release mechanism 35 that is activated by the user to release the vacuum in the vacuum lifting chamber 25. The vacuum release mechanism 35 may be a mechanical device, such as a valve that allows air to flow through e.g. a tube connecting the release mechanism and the vacuum lifting chamber 25. Alternatively the vacuum release mechanism may be electrical such as a switch. Actuation of the vacuum release mechanism 35 will allow air to flow into the vacuum lifting chamber 25 filling it with air and eliminating the vacuum within the vacuum lifting chamber thereby releasing the article 15.

The vacuum lifting device 10 further includes an extendable lifting member 40 having a first end 41 and a second end 42 (see FIGS. 1 and 2). The first end 41 is arranged on the first surface 21 of the base 20 and the second end 42 is provided with at least a first pair of handles. Advantageously the first end 41 of the extendable lifting member 40 is mounted on a bracket 43 fixed to the first surface 21 of the base 20. The extendable lifting member 40 is configured to shift the base 20 in a vertical direction, i.e. the extendable lifting member 40 will enable the base 20 to be raised or lowered in relation to the ground when in use.

The extendable lifting member 40 is configured to extend or contract such that the base 20 is shifted downwards or upwards in the vertical direction between the at least one pair of handles and the ground when the vacuum lifting device is in use. In an advantageous embodiment the extendable lifting member 40 is a scissor lift as seen in the FIGS. 1 and 2 and the folding supports 47 of the scissor lift are extended or contracted by means of a lift actuating member 46. The extendable lifting member 40 may be actuated mechanically (via a lead screw or rack and pinion system) or by means of hydraulic or pneumatic actuators. In FIGS. 1-2 the lift actuating member 46 is a gas spring which is mounted between the folding supports 47 of the scissor lift and when the gas spring is compressed (i.e. the piston rod is introduced into the piston cylinder) the folding supports 47 of the scissor are unfolded and the scissor lift extends the vacuum lifting device 10 in the vertical direction into an extended state (see FIG. 2). When the gas spring is decompressed (i.e. the piston rod is pulled out from the cylinder) the folding supports 47 of the scissor lift are folded together and the scissor lift contracts the vacuum lifting device 10 into a compressed state (see FIG. 1).

The at least one pair of handles is arranged on the second end 42 of the lifting member and may be gripped by the operator for maneuvering the vacuum lifting device 10. However, in an advantageous embodiment the second end 42 is provided with two sets of handles arranged opposite to each other on the second end 42 of the lifting member. This enables the vacuum lifting device 10 to be handled by two persons, each of them manipulating one set of handles. During normal use the handles extend parallel to the base plane of the base 20 but they may deviate from the base plane with at most 20°, at most 15°, at most 10°. Advantageously the handles are adjustable and may be tailored to the height of the user. The vacuum actuator control is provided on the handgrips so that it is possible in a simple manner, without having to move the hands with respect to the apparatus, to control the vacuum supply during the maneuvering of the device. The spacing of 30 to 60 cm between the handgrips is chosen for ergonomic reasons.

As shown in the FIGS. 1-3 the vacuum lifting device 10 may include a housing 50 provided on the base 20 to protect the vacuum generating member 30 and in some embodiments the vacuum actuator 31. Advantageously the housing 50 is provided with venting openings 51 to allow the air expelled by the vacuum generating means to be expelled.

The vacuum lifting device 10 may also include one or more lift point(s) 52 from which a machine or piece of equipment can attach and lift the vacuum lifting device 10 and article suctioned to the vacuum lifting device 10. This is advantageous when only one set of handles is provided on the vacuum lifting device 10 and the device is to be handled by one person only. The equipment may be a piece of construction equipment such as a crane, tractor, bobcat, track hoe, and the like capable of lifting the weight of the vacuum lifting device 10 and article 15. For example, the equipment may include a hydraulically operated arm or bucket capable of being lifted up and down and/or being moved around the site to position the article 15. In the illustrated embodiment, the lift point 52 is represented by an eyelet, and a chain is connected between the eyelet and the equipment.

The vacuum lifting device 10 facilitates lifting heavy articles 15 that are difficult or impossible to lift by hand. The vacuum lifting device 10 may be operated in a manner that minimizes damage, or the risk of damage to the articles 15. The vacuum lifting device 10 may be operated with minimal exertion by the person or persons installing the articles 15. The vacuum lifting device 10 may be configured to lift planar articles 15 having either rough or smooth external surfaces 16. For example, the vacuum lifting device 10 may be capable of lifting concrete article 15 that have rough surfaces or steel article 15 that have smooth surfaces. Additionally, while the article 15 are illustrated as having a planar lifting surface, may also be used to lift article 15 that have nonplanar lifting surfaces.

A method for lifting and/or repositioning an article 15 having an external surface may include the following steps:

A vacuum lifting device 10 as described herein is provided. Preferably the vacuum lifting device 10 is provided with two pairs of handles arranged in parallel with the base plane and opposite to each other. This means that two people can cooperate to manoeuver the vacuum lifting device 10.

Figure 4A:
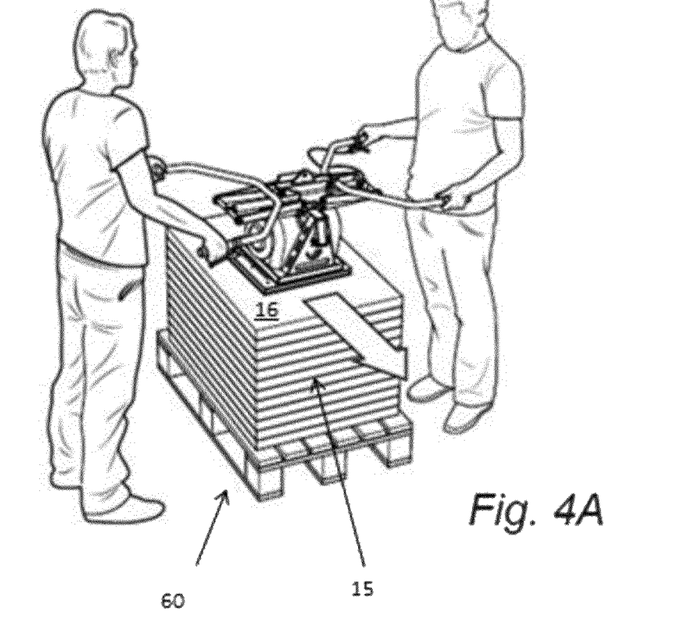
FIGS. 4A and B illustrate the vacuum lifting device in use
Figure 4B:
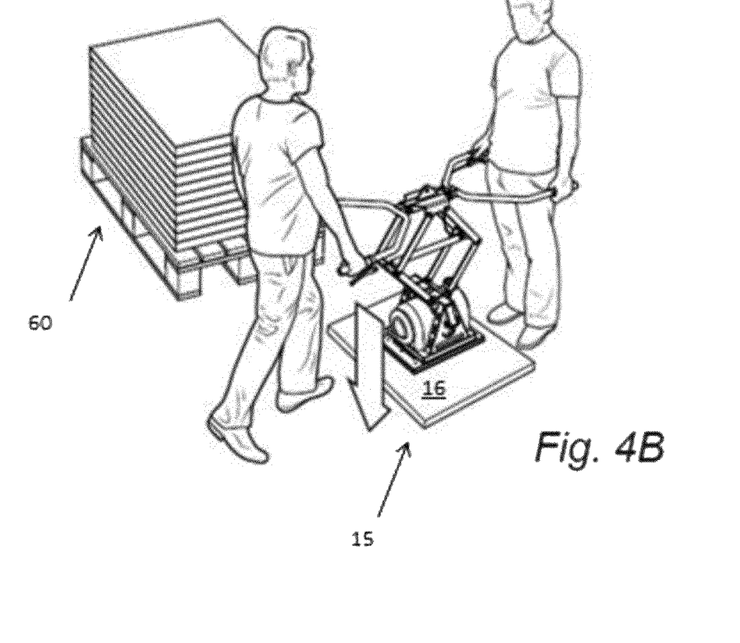

Each one of the two users grips a set of handles to lift the vacuum lifting device 10 in order to position the base 20 of the vacuum lifting device 10 on top of an external surface of an article 15 to be lifted and/or repositioned. Normally the lifting procedure starts by lifting the vacuum lifting device 10 from the ground and in this situation it is preferable that the vacuum lifting device 10 is in the compressed state (see FIGS. 1 and 4A). This is especially advantageous if the article 15 to be lifted is located on top of a pallet 60 as seen in FIGS. 4A and 4B). Since both pairs of handles extend from the vacuum lifting device 10 in the plane of the base 20 and the device is in the compressed state, the total height of the vacuum lifting device 10 is relatively low. This means that there is no need to lift the vacuum lifting device 10 any higher than to the uppermost article 15 stacked on the pallet 60. Depending on the height of the pallet 60, this may be around the height of the waist of a person that is about 180 cm tall, and no lifting of the device above the elbows is required as seen in FIG. 4A.

Once the base 20 with the sealing joint 24 is positioned on the external surface 16 of the article 15 to be lifted/repositioned, the vacuum generating member 30 is actuated by means of the vacuum control member 32 provided on the handles, and a vacuum between the external surface 16 of the article 15 and the second surface 22 of the base sufficient to support the weight of said article 15 when lifted is established.

After the required vacuum has been established between the vacuum lifting device 10 and the article 15, the vacuum lifting device 10 including the article 15 is lifted by the two users and carried to the desired location by means of the handles vacuum lifting device 10. Since the two pairs of handles extend in parallel to the base plane, it is only necessary for the users to lift the vacuum lifting device 10 enough to clear the article 15 from the pallet 60 (see FIG. 4A).

When the intended location for the article 15 is reached, the lifting member actuator 46 is actuated and the extendable lifting member 40 is unfolded to its extended state, thereby lowering the base 20 with the attached article 15 towards the ground (see FIG. 4B). The precise location of the article 15 may now be adjusted. It should be pointed out that the two users may still stand with straight backs as there is no need to bend over when placing the article 15 in the correct position. The arms of the users may have extended somewhat after having lifted the article 15 from the pallet 60 but there is no need to change the hand grip (see FIG. 4B).

After the exact location for the article 15 has been reached, the release mechanism 35 is actuated and air is allowed to flood the vacuum lifting chamber 25 thereby releasing the vacuum grip of the article 15. The extendable lifting member 40 may now be contracted and the vacuum lifting device 10 is returned to the contracted state ready to pick up the next article 15 from the pallet 60.

The vacuum lifting device 10 may of course also be used for lifting article 15 arranged on the ground and stacking them into a pile at a different location. In this case the lifting procedure is advantageously started with the vacuum lifting device 10 in the extended state wherein the base 20 is positioned onto the top of the external surface 16 of the article 15 to be lifted and/or repositioned from the ground.

Once the base 20 with the sealing joint 24 is positioned on the surface of the article 15 to be lifted/repositioned, the vacuum generating member 30 is actuated and a vacuum between the article 15 and the second surface 22 of the base 20 sufficient to support the weight of said article 15 when lifted is established.

Thereafter the lifting member actuator 46 is actuated and the extendable lifting member 40 is contracted, thereby raising the base 20 with the attached article 15 from the ground. The users now have the option to contract the extendable lifting member 40 completely or partly. A complete contraction may be required when the article 15 is to be placed somewhere higher, e.g. onto a pallet 60. However if the article 15 is to be shifted to another location close to the ground nearby, it may be sufficient to contract the extendable lifting member 40 only enough to be able to stay clear from the ground when moving the vacuum lifting device 10 with the article 15 in the horizontal direction to a new location.

When the final location for the article 15 is reached the release mechanism is actuated and air is allowed to flood the vacuum lifting chamber 25 and the vacuum grip of the article 15 is released.

Regardless of whether the article 15 is lifted from a high location and positioned in a lower location, or the reverse when it is lifted from a low location to a higher location, the users are not required to bend their backs over to reach low close to the ground, or raise their elbows high to be able to lift the vacuum lifting device 10 high enough. No change in hand grip is required as the vacuum lifting device 10 is held at nearly the same height throughout the lifting procedure.

The invention claimed is:

1. A vacuum lifting device (10) for facilitating the lifting and/or repositioning of an article (15) having an external surface (16), said vacuum lifting device (10) comprising at least one pair of handles (44, 45); and a base (20) having opposed first and second surfaces (21, 22) and an aperture (23) arranged through the base (20), said second surface (22) being arranged in a base plane of the base (20) and being provided with a continuous sealing joint (24) projecting downwards from said second surface (22) and defining an enclosed area which includes said aperture (23) on said second surface (22) of said base (20); and a suction conduit (33), said suction conduit (33) is arranged to be connected to a vacuum generating member (30) and configured to be in fluid connection with the second surface (22) of the base (20) through said aperture (23), said second surface (22) of said base (20) provided with said sealing joint (24) is arranged to be positioned onto a portion of said external surface (16) of said article (15) to be lifted and/or repositioned;

said vacuum lifting device (10) further comprises an extendable lifting member (40) being arranged between said at least one pair of handles (44, 45) and said first surface (21) of said base (20), characterized in that said extendable lifting member (40) is a scissors lift arranged to be actuated by a lift actuating member (46)

to contract or extend, thereby shifting said base (20) in a first vertical direction towards said at least one pair of handles or in a second direction, opposite to said first direction and away from said at least one pair of handles (44, 45), thereby transferring said vacuum lifting device (10) between an extended and a compressed state.

2. The vacuum lifting device (10) according to claim 1, further comprising a vacuum generating member (30) actuated by a vacuum actuator (31) for generating a vacuum, said vacuum generating member (30) is arranged on said first surface (21) of said base (20).

3. The vacuum lifting device (10) according to claim 2, wherein said vacuum generating member (30) comprises a vacuum release mechanism (35).

4. The vacuum lifting device (10) according to claim 2, wherein said vacuum generating member (30) comprises a vacuum reservoir (36).

5. The vacuum lifting device (10) according to claim 2, wherein a housing to enclose said vacuum generating member and said vacuum actuator is arranged on said base.

6. The vacuum lifting device (10) according to claim 1, wherein said extendable lifting member (40) is a scissors lift.

7. The vacuum lifting device (10) according to claim 6, wherein said lift actuating member (46) for shifting said base (20) in a vertical direction is a gas spring.

8. The vacuum lifting device (10) according to claim 1, wherein said lift actuating member (46) for shifting said base (20) in a vertical direction is actuated mechanically or by means of hydraulic or pneumatic actuators.

9. The vacuum lifting device (10) according to claim 1, wherein said sealing joint comprises one or more of natural rubber, butadiene rubber, butyl rubber, chlorinated polyethylene, chlorosulfonated polyethylene, epichlorohydrin rubber, ethylene acrylic, ethylene propylene rubber, fluorocarbon rubber, fluorosilicone, synthetic isoprene rubber, neoprene rubber, nitrile rubber (NBR), phosphonitrilic fluoroelastomer, polyacrylate rubber, silicone rubber, polysulfide rubber, polyurethane rubber, and flexible PVC.

10. The vacuum lifting device (10) according to claim 9, wherein said sealing joint (24) comprises foam rubber.

11. The vacuum lifting device (10) according to claim 1, comprising two pairs of handles (44, 45).

12. The vacuum lifting device (10) according to claim 11, wherein said handles (44, 45) deviate from the base plane by at most 30°.

13. The vacuum lifting device (10) according to claim 11, wherein said handles (44, 45) extend parallel to the base plane of the base (20).

14. The vacuum lifting device (10) according to claim 1, wherein said handles (44, 45) are adjustable to fit the height of a user.

15. The vacuum lifting device (10) according to claim 1, wherein each pair of handles (44, 45) are individually adjustable to fit the height of a user.

16. The vacuum lifting device (10) according to claim 1, wherein said vacuum lifting device is arranged to lift articles (15) of the group consisting of concrete or brick pavers, concrete slabs, pavement slabs, steel plates, trench covers, glass plates, packages, boxes, and/or parts used in industrial environments.

17. A method to facilitate the lifting and repositioning of an article having an external surface, said method including the steps of
providing a vacuum lifting device according to claim 1;
positioning the base member of the vacuum lifting device according to claim 1 on top of an external surface of an article to be lifted and/or repositioned actuating the vacuum generating member by means of the vacuum actuator establishing a vacuum between said article and said vacuum lifting device sufficient to support the weight of said article when lifted; and
moving said vacuum lifting device and said article to a location where article is to be repositioned; and
actuating said extendable lifting member to shift said base in the vertical direction to position said article in a new location; and
actuating said vacuum release mechanism to release said article having an external surface from said vacuum lifting device.

* * * * *